United States Patent [19]
Ratte et al.

[11] 3,943,208
[45] Mar. 9, 1976

[54] METHOD FOR BINDING SOLID PROPELLANT TO ROCKET MOTOR CASE

[75] Inventors: Jacques Ratté; Jean Bigras, both of Quebec, Canada

[73] Assignee: Her Majesty the Queen in right of Canada as represented by the Minister of National Defense, Canada

[22] Filed: Oct. 12, 1973

[21] Appl. No.: 405,974

Related U.S. Application Data

[62] Division of Ser. No. 149,303, June 2, 1971, abandoned.

[52] U.S. Cl............ 264/3 R; 149/19.9; 149/19.92; 102/103
[51] Int. Cl.² ........................................ C06B 21/00
[58] Field of Search......... 264/3 R; 149/19.9, 19.92; 102/103

[56] References Cited
UNITED STATES PATENTS

| | | | |
|---|---|---|---|
| 3,347,047 | 10/1967 | Hartz et al. | 102/103 X |
| 3,507,114 | 4/1970 | Webb | 264/3 R |
| 3,734,982 | 5/1973 | Sampson | 264/3 R |

Primary Examiner—Stephen J. Lechert, Jr.
Attorney, Agent, or Firm—Nathan Edelberg; Robert P. Gibson; James T. Deaton

[57] ABSTRACT

A method of bonding a solid rocket propellant to a motor casing using a flexible sheet insulant. The flexible sheet insulant is easily installed without intermediate adhesive on the metal or propellant side, retains its self-adhesive properties for long periods when stored at temperatures lower than 40°F before installation and has improved resistance to erosion. The flexible sheet insulant comprises an elastomeric polymer binder in particular a carboxyl-terminated polybutadiene having dispersed therein from 50–80% preferably 65–75% by weight of a siliceous filler reinforcing material at least 50% of which is in the form of fibers. Preferably the filler consists of 50 to 80% asbestos fibers and 20% to 50% asbestos floats.

2 Claims, 7 Drawing Figures

METHOD FOR BINDING SOLID PROPELLANT TO ROCKET MOTOR CASE

CROSS REFERENCE TO RELATED APPLICATIONS

This application is a division of applicants' co-pending application Ser. No. 149,303, filed June 2, 1971, and now abandoned and is related to divisional application Ser. No. 406,046 filed Oct. 12, 1973, and now Pat. No. 3,872,205.

The present invention relates to a flexible sheet insulant and in particular the present invention relates to an improved flexible sheet insulant used in a rocket motor containing a case-bonded solid rocket propellant. The insulant is easily applied without intermediate adhesive or linear coat on the metal or propellant side; it retains self-adhesive properties for long periods when stored at temperatures lower than 40°F before installation and has resistance to erosion at high temperatures from the combustion products during the firing of the rocket motor. The present invention also relates to a rocket motor containing said insulant bonded to the metallic wall of the casing of the rocket motor and also the said propellant. The present invention also includes the method of preparing said insulant.

The majority of modern composite propellant for rocket motors are cast directly into the case as a polymerizing paste and are cured in place. The metal parts exposed to hot gases during firing of the propellant are protected by an insulant or an arrangement of insulating materials which insulant also besides protecting the casing, bonds the propellant grain to the metallic wall of the casing. Thus the insulant is bonded to the propellant grain and is also bonded to the case wall.

In order to be an adequate insulant for the particular rocket motor, the insulant must be able to withstand the storage and firing conditions to which the rocket motor will be subjected, and in particular to withstand the various stresses and strains which occur under such conditions.

In particular, with respect to the storage conditions, rocket motors may be stored at temperatures anywhere in the range of −65°F to 160°F and when the propellant grain is cooled below its curing temperature, severe stresses are created at the interfaces, casing-insulant and insulant-propellant, because of the difference in coefficient of thermal expansion in the casing material and the propellant. Typical rough treatment to which a rocket motor may be exposed are for example: (a) storage for two or three days at −50°F with a quick heating up to 140°F and firing at the same temperature; (b) a rocket motor may be cycled between two extreme temperatures three or four times within a week and fired at a low or a high temperature; and (c) the motor may be stored at 140°F for four months and then fired at −50°F. Thus it will be readily seen from the above examples that the range of temperatures and the time of exposure at given temperatures and the rate at which the temperature changes will present great stresses and strains upon the insulant, the insulant must be able to withstand such stresses and strains and at the same time protect the casing wall from the combustion gases during firing and maintain a good bond between the casing wall and the propellant.

In addition to storage under very varied conditions, rocket motors may also be fired within a wide band of temperature ranges. Thus, the insulant must retain sufficient bonding and mechanical properties over the temperature ranges to compensate for various stresses created by fast pressurization during ignition and also by the acceleration forces and vibrations during flight. Further, the severity of the firing conditions varies with the particular thrust-time program required from a propellant grain bonded to the metallic wall of the case. The three basic thrust-time program are (a) the progressive thrust-time program, (b) the neutral thrust-time program and (c) the regressive thrust-time program. With progressive and neutral burning grains, the propellant acts like an efficient insulant throughout most of the combustion process and when the flame front reaches the case wall, there is very little propellant left in the combustion chamber. Thus, theoretically, progressive and neutral burning grains do not require a very elaborate insulation between them and the case wall. However, in certain rocket motors, special attention must be given to the nozzle end insulation particularly when the length to diameter ratio of the motor is high, for example greater than about 10:1. This is because the burning rate of the propellant grain is increased over its normal value when high velocity gases flow over the grain, i.e. erosive burning takes place. This effect is obviously more pronounced when the length to diameter ratio of the rocket motor is high. With the regressive burning grain, the exposure of the insulant to hot combustion products may occur very early during the firing sequence, and when this effect is combined with the propellant erosion at the nozzle end and also the very high flame temperature of formulations highly loaded with solids, the insulant is subjected to extremely severe firing conditions.

The insulant constitutes "dead weight" in the rockets in that it is an inert non-burning material. It is also desirable to keep the amount of dead-weight materials, such as the metal casing, the insulant and the restrictor which do not contribute to the propulsive performance of the rocket, to a minimum in order to make available more room for rocket propellant in the same motor casing. Further, the insulant should have a low thermal conductivity, good resistance to erosion of high velocity of gases, and good charring characteristics as pointed out in a paper entitled "Plastics as Heat Insulators in Rocket Motors", by Walter C. Hourt, Ind. and Eng. Chem., Vol. 52, No. 9, September 1960.

Heretofore insulants used in rocket motors containing case-bonded solid rocket propellants have fallen into two general classes, namely rigid insulants and flexible insulants.

Rigid insulants have low elongations of less than about 1% and are usually made of thermosetting resins with approximately 50% by weight of reinforcing materials and filler. They are normally preformed and are bonded to the inside wall of the case and cured in place with a resin coating. They are installed in locations exposed to severe firing conditions as heretofore referred. A typical rigid insulant used heretofore is one comprising 25–50% by weight of asbestos felt impregnated with 50–75% by weight of a phenolic resin. Another such rigid insulant is an epoxy resin containing 20–25% by weight of mica powder. Another such insulant is Novabestos paper impregnated with a phenolic or epoxy resin. However, with such rigid insulants, accumulation of stresses takes place at the propellant-insulant interface during temperature cycling and bond failure is likely to occur when motors are exposed to large variations in temperature. Further, the rigid insulants are not completely compatible with the propellants, for example, a polybutadiene propellant is not usually compatible with a phenolic resin-based insulant and bond failure is quite likely upon aging during storage. Again, an adhesive is required to glue the preformed insulant to the motor case and curing must take place at high temperature and high pressure, thus requiring expensive tooling and equipment.

The flexible insulants are usually elastomer-based with a low solids content and insure high elongations over the entire surface temperature range of the rocket motor. The elastomer is commonly a similar type to the propellant binder which improves the compatibility and the flexible insulants are used to take account of the severe storage conditions, to minimize the accumulation of stresses at the insulant-propellant interface and therefore to prevent bond failure between the propellant grain and the case. A typical flexible insulant is one formed from a carboxyl-terminated polybutadiene supplied under the trademark "HC Polymer 434" by Thiokol Chemical Corporation, containing a tris(2-methylazaridinyl)-phosphine oxide curing agent (MAPO) and a trifunctional epoxide curing agent (ERLA 0500) as well as a thixotropic agent (Thixcin E) and iron octasol (metal salt of 2-ethylhexoic acid) as catalyst and containing asbestos floats as filler to give good flame resistance and low thermal conductivity. A typical formulation is as follows:

| Formulation | pbw |
| --- | --- |
| HC Polymer 434 | 84.20 |
| MAPO | 2.22 |
| ERLA-0500 | 1.78 |
| Asbestos Floats | 10.30 |
| Thixcin E | 1.00 |
| Iron Octasol | 0.50 |

Another such flexible insulant is a heat-resistant mica powder dispersed in a polyurethane binder and having the following composition:

| Ingredients | % by Weight |
| --- | --- |
| Niax Diol*(PPG-2025) | 52.3 |
| Niax Triol**(LHT-112) | 6.8 |
| 2,4 Tolylene Diisocyanate | 6.1 |
| Di-2-ethylhexyl azelate | 3.3 |
| Ferric Acetyl Acetonate | 0.2 |
| Mica Powder | 31.3 |

*Polypropylene glycol molecular weight about 2025
**Polymer triol molecular weight about 1500

| Ingredients | % by Weight |
| --- | --- |
| Niax Diol*(PPG-2025) | 52.3 |
| Niax Triol**(LHT-112) | 6.8 |
| 2,4 Tolylene Diisocyanate | 6.1 |
| Di-2-ethylhexyl azelate | 3.3 |
| Ferric Acetyl Acetonate | 0.2 |
| Mica Powder | 31.3 |

*Polypropylene glycol molecular weight about 2025
**Polymer triol molecular weight about 1500

The flexible insulants are usually applied to the inside wall of the casing of the rocket motor as a low viscosity slurry. Their solids content is relatively low, and as a result their resistance to erosion at high temperature is substantially lower than that of rigid insulants. the common technique for the application of flexible insulants are by spinning and jet spraying. Spinning is the more economical, but a severe penalty is paid to the performance of the rocket in terms of dead weight as the unrequired insulant flows into the lowest spot of the wall of the casing during centrifugation. This is somewhat compensated for by a more uniform propellant web as a result of smoothing the imperfections (bow and ovality) of the thin-walled case, but the compensation is insufficient to make up for the aforesaid penalty. Alternatively, spraying is useful when an even layer of insulant is required, but this has many limitations in that it involves complicated equipment resulting in frequent shutdowns, poor proportioning of ingredients, slow speed and sometimes high solvent content with increased fire and health hazard.

When both severe firing and severe storage conditions are simultaneously encountered, neither the flexible or rigid insulant is entirely satisfactory and a combination of rigid and flexible insulants is often used, the insulants being applied in different areas. Thus, the casing is protected by the thickness of the propellant plus the flexible insulant, while the ends of the casing which becomes more and more exposed to flame and combustion products during combustion, need additional protections and thus are coated with the rigid insulant.

The present invention provides a composition for use as a flexible insulant in a rocket motor containing a case-bonded solid rocket propellant which is simple and inexpensive to prepare and apply: a dough is rolled into a sheet which is molded into the rocket motor casing, by a simple technique and which bonds directly to the casing of the rocket motor and to the propellant. Further, the composition of the present invention forms a flexible insulant with the attendant advantages of flexible insulants when subjected to severe firing and storage conditions. The said composition has improved erosion resistance to high temperature combustion gases formed from the solid propellant such that it may be applied completely over the inside wall of the casing and provide good insulation irrespective of the conditions of storage and firing.

It has now been found according to the present invention that by incorporation into the curable elastomeric polymer binder of a flexible insulant of substantially increased amounts of fire resistant siliceous reinforcing filler in an amount of 50–80% by weight in which filler at least 50% by weight of the filler is in the form of fibers, that the insulant obtained has substantially all the advantages and properties of the flexible insulant with substantially improved resistance to erosion by hot temperature gases produced by the combustion of the propellant. This insulant can be simply formulated into the form of a dough which can be either stored at low temperature with good shelf life properties, or can be molded into the casing of the rocket motor and readily bonded to the metallic wall, e.g. steel wall of the rocket casing and in a preferred embodiment thereof, is readily bondable to the rocket propellant without the use of adhesives.

The present invention thus provides in a composition for use as a flexible insulant in a rocket motor containing a case-bonded solid rocket propellant, said composition comprising a curable elastomeric polymer binder and a fire resistant siliceous reinforcing filler, the improvement in which said filler is present in an amount of from 50–80% by weight of said composition, at least 50% by weight of said filler being in the form of fibers. e form of fibers.

The present invention also includes in a rocket motor comprising a case-bonded solid rocket propellant cast in a rocket motor casing and bonded to the inside wall of said rocket motor casing by means of an insulant comprising a curable elastomeric polymeric binder and a fire-resistant reinforcing siliceous filler dispersed therein, the improvement in which the filler is present in an amount of from 50–80% by weight of said composition, at least 50% by weight of said filler being in the form of fibers.

It is critical to the present invention that the flexible insulant have a high solids content in the range from about 50% to 80% by weight of the composition as opposed to the conventional flexible insulants which have a low solids content of 10 to 35% by weight. Thus below about 50% by weight, the erosive resistance of the insulant to the hot gases produced by combustion of the rocket propellant is sufficiently low as to be not particularly useful in the areas of the rocket casing subjected to such erosion. Further, processing of the composition to produce the sheet becomes elaborate, the baking time of the premix is substantially increased and the rolling time is substantially increased. While a higher amount of catalyst in the curable binder will substantially reduce the aforesaid processing problems, the shelf life of the sheet even at low temperatures is substantially reduced. Above 80% solids content, the solids will not be properly wetted by the binder, and the finished product will have poor elongation properties tending to form a rigid insulant, so that the shelf life of the sheet produced in the process of the present invention will be very short with the result that the period during which good adhesion can be achieved between the insulant and the casing wall on the one hand and the insulant and the propellant grain on the other hand will be greatly reduced. Thus, the 50–80% concentration of the filler is a compromise between conflicting requirements such as the processing method of preparing the sheet for forming the insulant, the mechanical properties of the insulant, the shelf life of the sheet insulant, the adhesion of the insulant with the casing wall on the one hand and the propellant on the other, the erosive resistance of the insulant to high temperature gases produced by combustion of the propellant and the cost of producing the insulant.

The siliceous reinforcing filler of which at least 50% by weight is in the form of fibers, preferably asbestos fibers, acts as a heat resistant material to provide sufficiently low thermal conductivity in the insulant and to reinforce the binder for better ablative resistance, i.e. erosive resistance of the insulant to high temperature gases produced by combustion of the solid propellant grain. The fibers can form substantially all of the filler material producing a flexible insulant of high modulus, but the substition of part of the fibers e.g. asbestos fibers, by siliceous powder, e.g. asbestos floats (powder) improves the rolling and molding characteristics of the sheet material obtained from the process of the present invention without greatly reducing the flexible modulus of the insulant. Preferably, the filler material contains 20–50% by weight of the siliceous filler in the form of a powder. However, those siliceous materials with asbestos fibers and floats are preferred. For example, with other siliceous materials such as diatomaceous silica, the bonding of the insulant to the metallic surfaces is weaker and the insulant exhibits slightly inferior erosion resistance when compared with insulants reinforced with asbestos fibers and floats. The asbestos fibers are desirably in the form of semi-open fibers i.e. subdivided or fiberized form. As compared with unopen fiber bundles, they produce a sheet with a smoother finish and a better fiber dispersion. The length of the asbestos fibers is suitably less than one-half inch and preferably the majority of the fibers are not finer than 0.053 inch in length.

The curable elastomeric polymeric binder may be any binder which has heretofore been used for flexible insulant. Suitably, the polymeric binder is the same as the binder used in the solid castable propellant forming the rocket motor as it is found that the compatibility of the insulant with the propellant is important in that the bond, between the insulant and the propellant having the same elastomeric binder, is extremely good and as such there is not necessity for any intermediate liner to improve the bonding between the propellant grain and the insulant.

The elastomeric binder according to one embodiment of the present invention, in view of the use of telechelic polymers as the binder for the propellant grain, is preferably a telechelic polymer. The term "telechelic polymer" as used herein is as set forth in for example, U.S. Pat. No. 3,281,335 issued Oct. 25, 1966, to C. A. Wentz and E. E. Hopper as well as an article by the same authors entitled "Process for the Production and Purification of Carboxytelechelic Polymers" pages 209–211 of I. & E. C. Product Research and Development, Vol. 6, No. 4, December 1967. In these references telechelic polymers are defined as polymers which are produced by the polymerization of vinylidene containing monomers having reactive groups in each end of the polymer molecule. The telechelic polymer is suitably a polybutadiene and in a preferred embodiment of the present invention is a carboxyl-terminated polybutadiene desirably rich in cis isomer such as that supplied under the trademark "HC 434" by Thiokol Chemical Corporation. However, with the recent advent of hydroxyl-terminated polybutadiene binders in solid rocket propellants such as is disclosed in Canadian Patent Application No. 065,102 filed Oct. 17, 1969, Boivin et al. the telechelic polymer may be a hydroxyl-terminated polybutadiene. Thus a particular curable polymeric binder composition which may be mentioned comprises a carboxy-terminated polybutadiene such as that supplied under the trademark HC 434 by Thiokol Chemical Corporation, a tri-functional epoxide curing agent such as that supplied under the trademark "ERLA-0510" by Union Carbide and iron Octasol as curing catalyst. Thus, a particular dough composition produced by the process of the present invention comprises between 20 and 33% by weight of the carboxyl-terminated polybutadiene, 1 to 1.7% of the tri-functional epoxide, iron Octasol suitably in an amount from 1 part per 5 parts of tri-functional epoxide and the remainder comprising asbestos fibers and floats, the ratio of fibers to floats being desirably in the range 3:1 and the ratio of curing epoxide to polymer being in an equivalent ratio of 1:1. The preferred insulant formulation comprises by weight percent HC-434 polymer 28.2, ERLA-0510 1.5, iron Octasol 0.3, asbestos fibers 52.5 and asbestos floats 17.5.

The present invention also includes a method of preparing a partially cured composition in the form of a sheet for use as a flexible insulant in a rocket motor containing a case-bonded solid rocket propellant. The method comprises admixing the curable elastomeric polymer binder with from 50–80% by weight of the total composition of the siliceous heat-resistant reinforcing filler at least 50% of which is in the form of fibers, therefor partially curing the mixing ingredients to a dough consistency required for rolling and rolling said partially cured dough into said sheet. The partially cured sheet may then be pressed around the inside walls of a rocket motor casing to effect molding and bonding between said sheet and said wall and the castable rocket propellant is then introduced into the casing and the propellant and insulant fully cured thereby effecting a bond between the insulant and the propellant.

Thus, in a particular embodiment of the present invention, for preparing the preferred partially cured dough composition using a carboxy-terminated polybutadiene polymer the ingredients are mixed suitably in a sigma-blade mixer for about 30 minutes at about 140°F, the resulting dough is placed in plastic bags and further partially cured at about 160°F for about two hours, the further partially cured dough is then fed to a differential speed rolling mill and rolled for about five minutes which operation provides a more homogeneous sheet and the cylinders of the differential mill are kept at a temperature lower than about 100°F. This sheet is then fed to a finishing even speed mill from where a sheet of uniform thickness is obtained and once more the temperature of the cylinders of the mill should not exceed about 100°F. In this way, a roll formed sheet material ranging from 0.020 to 0.125 inches in thickness has been prepared and at this stage the partially cured roll formed sheet can be immediately installed in a rocket motor as insulant or stored in sealed plastic bags at a temperature lower than 40°F. When the sheet is installed in a rocket motor, this molding and bonding of the sheet into the rocket motor is accomplished by using a rubber bag which is pressurized to about 120 psi for about two hours in an oven set at about 140°F. After that period, the casing having the partially cured insulant bonded thereto is directed to the casting house where the rocket propellant is cast directly on the insulant surface and no adhesive is necessary at bonding time or casting time. When using a sheet that has been stored for a certain length of time at a temperature lower than 40°F it is allowed to reach room temperature before opening the sealed plastic bag, the molding and bonding operation proceeding in the same manner as described above.

It will be realized that upon the installation of a rigid insulant in a rocket motor casing, the insulant does not match the imperfections in the casing, and usually an adhesive is required to fill the gaps. In addition a fully vulcanized material, whether it is rigid or flexible, is not self-adhesive to the metal or propellant. However, in contrast thereto, with the roll formed (RF) insulant of the present invention, the sheets are allowed to cure just enough to permit the rolling operation and no more so that at the molding and bonding stages they are partially cured material. Storing the material at low temperatures slows down its polymerization rate and allows delayed molding and bonding operations. The bonding operation consists as aforesaid in pressing the insulant against the metal wall at about 120 psi for two hours at about 140°F. At this stage the insulant is not yet fully cured and the propellant is dumped into the insulant casing and full curing of the assembly is accomplished during the propellant normal curing cycle.

The sheet compositions of the present invention have a good shelf life, i.e. retain their self-adhesive properties when stored at temperatures lower than 40°F before their installation in rocket motors.

The present invention will be further illustrated by way of the following Examples in conjunction with the accompanying drawings in which.

EXAMPLE 1

A dough for use as an insulant in a rocket motor containing a solid rocket propellant containing a carboxy-terminated polybutadiene binder was prepared from the following ingredients.

Liquid phase

A liquid carboxy-terminated polybutadiene polymer supplied under the trademark HC-434 containing 2% of phenyl-betanaphthylamine as antioxidant.

A trifunctional epoxide curing agent supplied under the trademark ERLA-1510.

An iron Octasol as catalyst.

Solid phase

A reinforcing filler consisting of 3 parts of asbestos reinforcing fibers (Johns-Manville Grade 3Z12) and one part of asbestos floats (Johns-Manville Grade 7TF1). The fiber length distribution of the fibers determined according to the Quebec Standard Screen Test is shown in Table I below.

TABLE I

| Screen | Weight (oz) |
|---|---|
| ½ in. screen (0.500 in.) | 1 |
| 4 mesh (0.187 in.) | 9 |
| 10 Mesh (0.053 in.) | 4 |
| Bottom Pan | 2 |

Before formulation, the HC-434 polymer was dehydrated in a glass-lined reactor for four hours at 190°F and an absolute pressure of 5 mm. of mercury, a maximum of 0.025% being the accepted moisture level. The polymer was preheated to 140°F to reduce its viscosity and to facilitate handling. The curing epoxide was stored at 55°–60°F and handled at room temperature. The catalyst is stored and handled at room temperature. The asbestos floats were dehydrated in an atmospheric pressure oven at 300°F for 24 hours. The asbestos fibers were used as received without any treatment.

The liquid phase consisted of 94.10% of HC-434, 4.90% of ERLA-1510, and 1% of iron Octasol and the solid phase consisted of 75% fibers and 25% floats and the ingredients were mixed by the method hereinafter described in such proportions as to produce three separate insulant dough formulations numbered 1899, 1889 and 1875 as set forth in Table II.

TABLE II

| Ingredient | Specification No. | | |
|---|---|---|---|
| | 1899 | 1889 | 1875 |
| Elastomeric binder | 40 | 30 | 20 |
| Asbestos Fibers J. M. Grade 3Z12 | 45 | 52.5 | 60 |
| Asbestos Floats J. M. Grade 7TF1 | 15 | 17.5 | 20 |

The preliminary mixing of fibers, floats and elastomeric liquid composition was accomplished in a sigma-blade mixer at 25 rpm. which mixer was preheated to 140°F and maintained at that temperature throughout the mixing period. In the mixing, the polymer was first introduced followed by the curing agent and the catalyst and the mixing of the liquid ingredients proceeded for 5 minutes. The fibers and floats were then added to the binder in small increments, the wetting and dispersion of all solids being accomplished over a period of 20 minutes and the resulting elastomeric impregnated mass or dough was fairly stiff and was recovered from the mixer by simply reversing the blade action. To be able to proceed with success through the first milling operation, the dough must reach an optimum consistency and for example particularly for the insulant formulation No. 1889 the dough was more easily rolled after a two hour partial curing at 160°F and all the doughs were subjected to such treatment.

The partially cured dough was then further mixed and converted into a blanket on a differential speed roller mill, the slow speed and high speed of the rolls of the 14 inch diameter by 30 inch wide mill being maintained at 5 and 6 rpm. respectively during the production of the dough. These relatively low speeds minimize the work generated heat during rolling and the rolls were cooled at below 100°F by cold water circulation. A homogeneous and smooth blanket was produced which adhered to the fast roll within a two-minute rolling cycle or a total of ten passes through the mill. The sheet was then fed to a final sheeting mill which was an 8 inch diameter by 16 inch wide mill with two rolls turning at an even speed of 8 rpm. and the rolls were cooled and the speed was kept low as with the previous mill to avoid excessive heat. The sheet was passed through the mill in five passes to yield a homogeneous smooth flexible sheet in thickness varying from 0.20 to 0.126 inches and a width of 13 inches and were cut in 40 or 48 inch lengths, placed in polyethylene bags and stored at 40°F, or sent directly to mold and bond into the steel casing of a rocket motor for containing a case-bonded solid rocket propellant. For installation into the rocket motor casing, the material whether previously stored or used directly was at room temperature and when stored was not removed from the sealed polyethylene bag unit it reached room temperature to prevent moisture contamination. The material was trimmed to the motor dimensions, hand-rolled and inserted into the casing. The molding bag, before insertion into the rocket motor casing was completely wrapped in a 4 mil thick Teflon liner for easy removal and Teflon spacers were placed inside the end cap (or caps) before closing. An initial pressurization of 20 psi maximum for one or two minutes was first effected with a slow pressure rise to prevent air inclusion between the casing and the insulant. The bag was then pressurized to a final pressure of 120 psig and the pressure and molding and bonding operations then proceeded at an oven temperature of 140°F for two hours. After dismantling the bag from the motor casing, a visual inspection was carried out. The resulting transverse joint should be butt-ended and not overlapped and any air blisters were simply punctured and the pressure and heat reapplied for an additional 20 minutes. The insulated casing was then flushed with dry nitrogen, two bags of silica gel were placed inside the casing and the thread protectors and sealing caps are fitted. The insulated casing was now ready to be directed to storage or to the casting house for the casting of the solid rocket propellant. The carboxy-terminated polybutadiene propellant was then cast directly into the insulant without any additional surface treatment and was subjected to a standard curing time of 9 days at 140°F and at atmospheric pressure.

Figure 1:
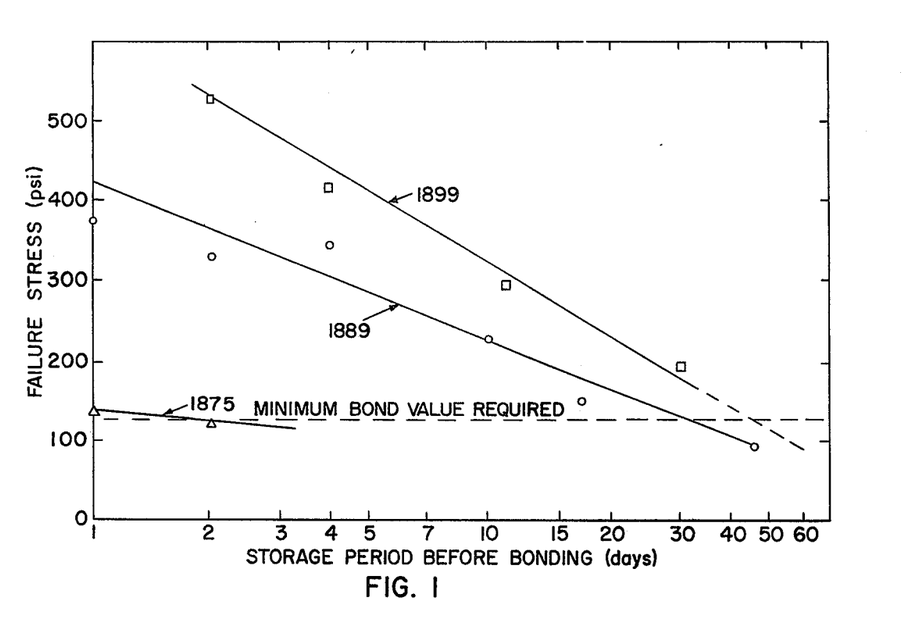
FIG. 1 is a plot of the tensile stress at failure between the insulant and the metallic surface for insulants of various solids content when stored at room temperature for a period of time (75°F)

An important characteristic of the carboxy-terminated polybutadiene insulants of the present invention is that they are self-adherent to metal and to the carboxy terminated polybutadiene propellant without any intermediate adhesive either on the metal side or on the propellant side. The evaluation of the propellant case bonding is thus greatly simplified and it is sufficient to study the two interfaces metal-insulant and insulant-propellant or the assembly metal-insulant-propellant. Because the binders in the propellant and the insulant are of the same formulation, the bond between the insulant and the propellant does not pose any problem as long as the uncured propellant is not cast onto an insulant which has already been fully cured. The bond between the metal and the insulant is more critical and is directly related to the shelf life of the insulant. It should be noted that the insulant dough is polymerizing during its mixing, rolling, storage, and bag molding and is therefore chemically active until fully cured. Ideally, the full curing takes effect during the 9 day curing cycle of the propellant. The bond strength between the metal and the insulant was examined on 0.5 by 0.5 inch test blocks of mold steel normally machined without any other surface treatment except degreasing. The test specimens from the aforesaid dough rolled into sheets received the same treatment as the sheet material applied in the motor, namely a molding at 120 psig for two hours at 140°F followed by a standard curing cycle of nine days at 140°F and at atmospheric pressure. Failure tests were then carried out at 75°F. In a first series of tests, the specimens had been previously stored for varying periods of time at 75°F and the results obtained for the various doughs are given in FIG. 1. It will be seen that the tensile strength at failure of the metal insulant specimens decreases very quickly as the solids load is increased and further the shelf life of the material, i.e. the periods of time during which the material is stored at 75°F is approximately 50 days for the 1899 insulant containing 60% solids, 35 days for the 1889 insulant containing 70% solids, and only 2 days for the 1875 insulant containing 80% solids, each shelf life being based on a minimum bond of 120 psi, which corresponds approximately to the tensile strength value of the carboxy-terminated polybutadiene propellant formulation normally used in rockets at room temperature.

Figure 2:
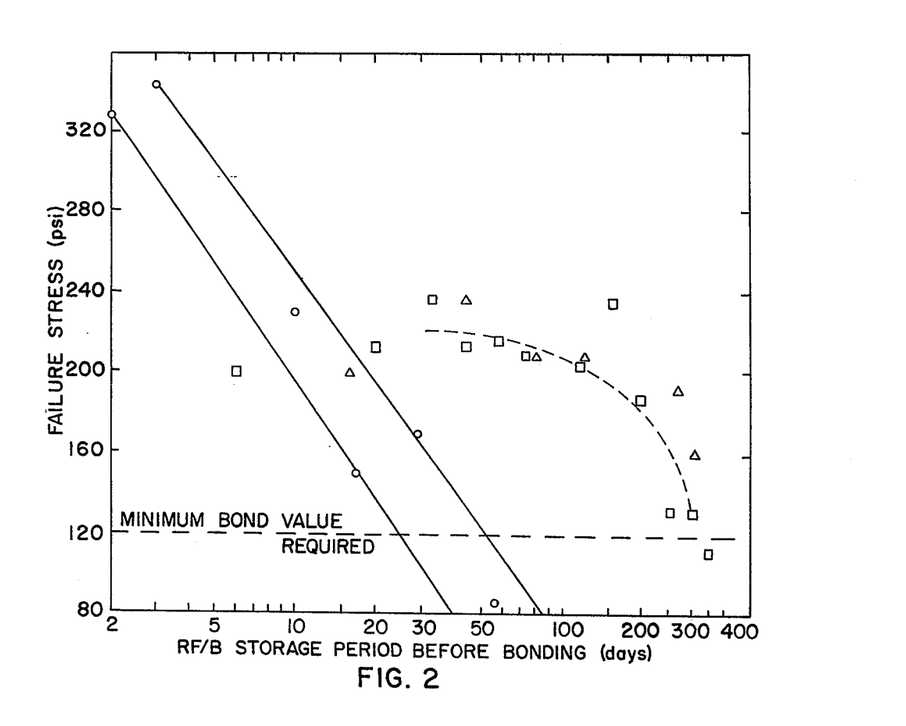
FIG. 2 is a plot of the tensile stress at failure between the insulant and the metallic surface for a particular insulant stored at 75°F, 40°F, and 5°F, for a period of time.

Further tests were carried out on the 70% solids 1889 insulant which had been stored at 40°F and 5°F and tested for failure stress at 75°F, the results being given in FIG. 2. It will be seen from FIG. 2 that the tensile stress value is consistently above 200 psi for materials stored at 40°F and at 5°F. The sheets stored at 40°F showed a shelf life of 340 days and the shelf life of the material stored at 5°F being substantially in excess of this time.

Figure 3:
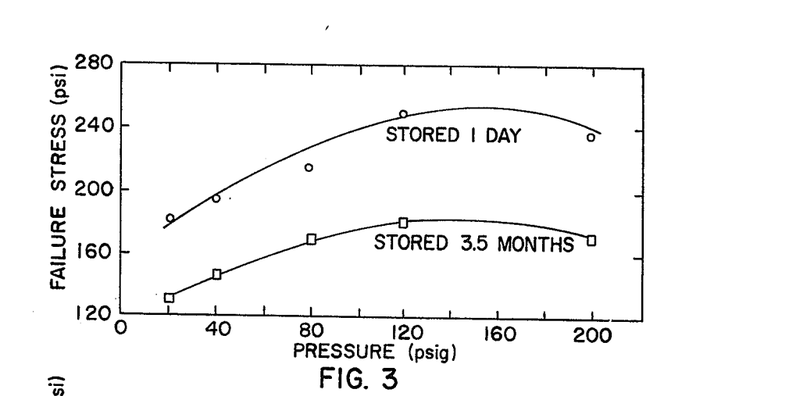
FIG. 3 is a plot of the tensile stress at failure between the insulant and the metallic surface according to the molding pressure.
Figure 4:
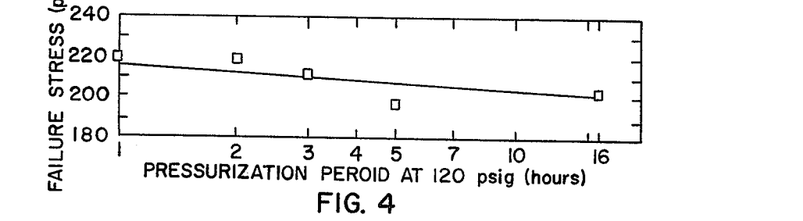
FIG. 4 is a plot of the tensile stress at failure between the insulant and the metallic surface according to the pressurization period.

To determine the effect of molding pressure on the bond, similar tests were carried out on the insulant 1889 on the metallic test blocks using pressure ranging from 20–200 psig. The samples were assembled at room temperature and pressurized for one hour at 140°F and bonding and full curing proceeded at the same temperature and atmospheric pressure for nine days and after this period the assemblies were cooled to room temperature and tested for failure stress. One set of experiments was conducted on the material which had been stored at 40°F for 3½ months. The results obtained are given in FIG. 3. It will be seen that in both samples the best bonding values were obtained with the samples pressurized to a minimum of 120 psig, the material stored over prolonged periods of 3½ months not requiring a higher pressure to produce good bonding with the metal. The effect of pressurization period at 120 psig of bonding behavior between the insulant and the metal was also effected using the material 1889 aged for three months at 40°F prior to bonding, the pressurization period at 120 psig was varied from 1 to 16 hours before the normal curing period, of 9 days at 140°F and atmospheric pressure, started. The results obtained are given in FIG. 4. It will be seen from FIG. 4 that the pressurization period does not appreciably affect the bonding strength.

Figure 5:
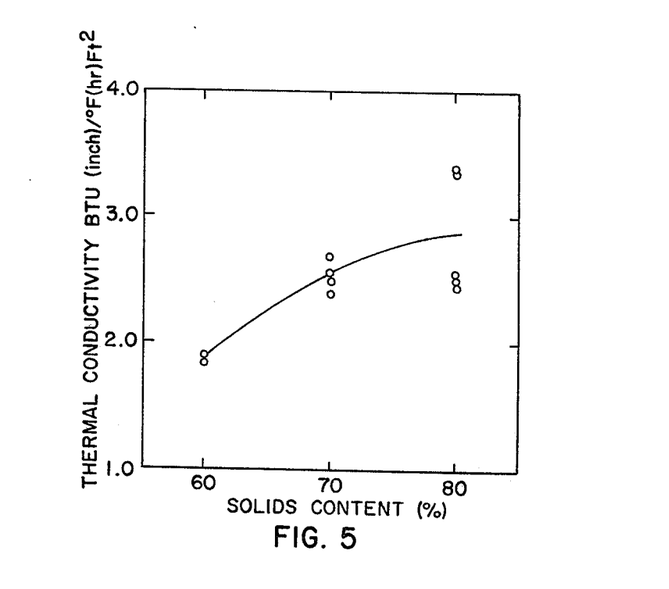
FIG. 5 is a plot of thermal conductivity of the insulant with solids load.

The thermal conductivity of the insulant was tested at 100°C on a Lees disc apparatus, the determinations being made on non-molded samples 0.100 inches thick. The effect of the solids load on thermal conductivity is shown in FIG. 5 and it will be seen that the 1899 insulant at 60% solids load, a thermal conductivity of 1.88 BTU (inch)/°F (hour) Ft.$^2$ was obtained. When the solids load was changed to 70 and 80%, i.e. insulants 1889 and 1875 the thermal conductivity increased to 2.54 and 2.9 respectively. The thermal conductivity values shown in FIG. 5 show a greater dispersion at 80% than at 60 and 70% solids load, and this it is believed can be explained by the lower flexibility of the insulant made with 80% solids which probably contributes to the trapping of air pockets between the metal plates of the apparatus. The following Table III represents a comparison of the thermal conductivity of the insulants of the present invention with that given by Plant, H. T. and Goldstein, M. in an article entitled "Plastics For High Temperatures Thermal Barriers", The Society of the Plastics Industry Inc., 15th Annual Meeting of the Reinforced Plastic Division, February 1960, Section 18D, as well as Johns-Manville, Thermomat 193.

TABLE III

| Material | $K \dfrac{\text{BTU (inch)}}{\text{°F (hr) Ft.}}$ |
|---|---|
| Epoxy Asbestos Cloth | 4.76 |
| Epoxy Refrasil Cloth | 3.44 |
| Insulant 1875 (80% solids) | 2.9 |
| Johns-Manville | |
| Thermomat 193 | 2.80 |

TABLE III-continued

| Material | $K \dfrac{\text{BTU (inch)}}{\text{°F (hr) Ft.}}$ |
|---|---|
| Phenolic Glass Cloth | 2.70 |
| Insulant 1889 (70% solids) | 2.54 |
| Teflon Glass Cloth | 2.26 |
| Silicone Glass Cloth | 2.08 |
| Insulant 1899 (60% solids) | 1.88 |

Figure 6:
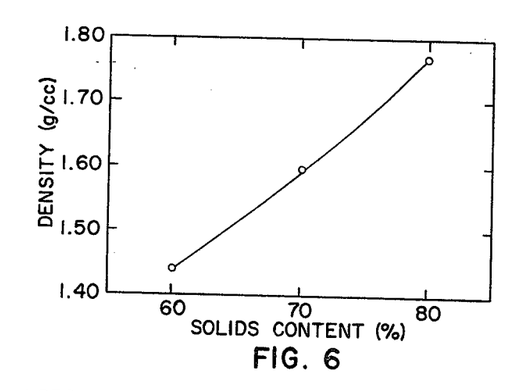
FIG. 6 is a plot of density of insulant with its solid content.
Figure 7:
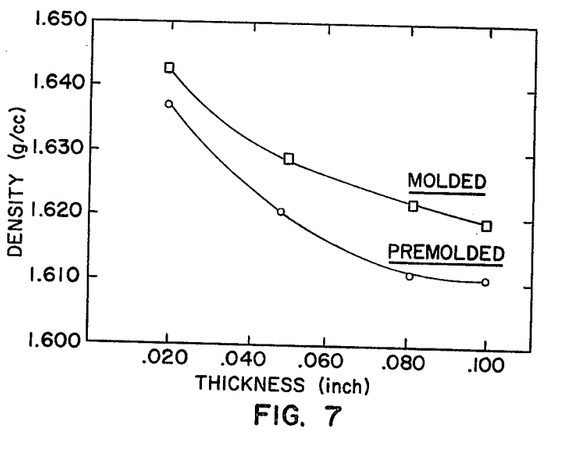
FIG. 7 is a plot of variations in density of the insulant with thickness and with molding.

It was found that the density of the insulant varies with the milled thickness and the insulant 1889 milled to 0.020 inch has a premolded density of 1.64 g/cc and of 1.61 g/cc only when milled to 0.100 inch. The effect of molding at a pressure of 120 psig on the density of the insulant was also tested and a sheet 0.020 inch thick with a premolded density of 1.64 g/cc showed a density of 1.645 g/cc after molding. A sheet 0.100 inch thick had a premolded density of 1.61 g/cc which increased to 1.62 g/cc after molding. FIG. 6 shows the effect of the solids load on the premolded density of the aforesaid insulant rolled to a thickness of 0.100 inch and FIG. 7 shows the variation in density with mil thickness and also the influence of the molding on the density of the material containing 70% of solids. The mechanical properties of the sheet of insulant material were evaluated on an Instron Tensile Tester at a crosshead speed of 0.05 inch per minute over a temperature range of 140 to −65°F and the results for a freshly rolled sheet and for a sheet aged for four months at 40°F with the No. 1889 insulant are listed in Table IV, all specimens having been cured for nine days at 140°F prior to such mechanical testing.

TABLE IV

| Material | Temperature °F. | σm* (psi) | εm** (%) | E*** (psi) |
|---|---|---|---|---|
| Fresh (M.D.) | 140 | 1087 | 4.8 | 2.96 × 10⁴ |
| | 73 | 1435 | 5.9 | 3.63 |
| | 0 | 2215 | 7.6 | 4.64 |
| | −50 | 3333 | 6.3 | 6.25 |
| | −65 | 3500 | 9.3 | 4.75 |
| Fresh (C.M.D.) | 140 | 804 | 9.4 | 1.26 × 10⁴ |
| | 73 | 1035 | 8.2 | 1.78 |
| | 0 | 1551 | 10.2 | 2.27 |
| | −50 | 2548 | 11.0 | 3.00 |
| | −65 | 2865 | 13.1 | 3.39 |
| Aged four months at −40°F. (M.D.) | 140 | 1191 | 7.2 | 2.30 × 10⁴ |
| | 73 | 1634 | 8.8 | 2.17 |
| | 0 | 2681 | 10.0 | 4.35 |
| | −50 | 4681 | 8.6 | 6.98 |
| | −65 | 4900 | 10.5 | 6.27 |
| Aged four months at −40°F. (C.M.D.) | 140 | 894 | 15.2 | 0.97 × 10⁴ |
| | 73 | 1335 | 14.6 | 1.55 |
| | 0 | 2006 | 13.0 | 2.84 |
| | −50 | 3582 | 14.4 | 3.58 |
| | −65 | 3681 | 16.1 | 3.32 |

\* σm = Tensile Strength at Maximum Load.
\*\* εm = Elongation at Maximum Load.
\*\*\*E = Initial Modulus
M.D. and C.M.D. refer to machine and cross-machine directions respectively during the rolling operation.

It will be seen therefore that the insulant forms a strong bond between the metal wall of the rocket motor casing and the propellant grain, provides good mechanical properties at extreme conditions of storage and firing at a temperature ranging from −50° to 140°F and maintains structural integrity mainly with spin stabilized rocket motors. Further, the insulant does not require primer coatings or adhesive coating between the metal wall and the insulant and the insulant and the propellant and has good mechanical properties comparable to those of flexible insulants and erosion resistance to high temperature gases for example in the range 6,000° to 6,500°F during motor firing. The insulant is further easily manufactured and is easily installed into the casing and is compatible with carboxyl-terminated polybutadiene propellant.

Comparison of erosive resistance of various insulants was carried out using actual motor firings. Insulated motors 4 in. internal diameter and 40 in. long were filled with the same solid composite propellant composition and incorporating the same grain cross section. Measurements of insulation thicknesses were taken before and after firing at identical critical locations. The affected insulant thicknesses reported in the following Table V are the difference between the "before firing" readings and the remaining solid insulant after firing: they are the amount of insulant ablated during the combustion process for particular insulants.

TABLE V

| Insulant | Type of Insulant | Initial Thickness (in.) | Affected Insulant (in.) | |
|---|---|---|---|---|
| | | | At Head End | At Nozzle End |
| Asbestos phenolic | Rigid | 0.075 | 0.034 | 0.041 |
| Asbestos filled epoxy (54% floats) | Rigid | 0.086 | 0.048 | 0.054 |
| 30% Mica powder in carboxyl-terminated polybutadiene (HC polymer 434) binder | Flexible | 0.075 | — | All charred |
| Formulation 1889 (70% solids) | Flexible | 0.049–0.098 | 0.017 | 0.035 |

The results show that of the initial thickness of insulation used, 45% and 55% was ablated for the asbestos phenolic, 56% and 63% for the asbestos filled epoxy, the 30% mica powder in a carboxyl-terminated polybutadiene binder was all charred at the nozzle end, while for formulation Specification No. 1889 only 35% and 36% of material was ablated.

We claim the embodiments of the invention in which an exclusive property of privilege is defined, as follows:

1. A method comprising preparing a partially cured composition in the form of a sheet for use as a flexible insulant in a rocket motor containing a case-bonded solid rocket propellant which comprises admixing a curable elastomeric polymer binder, a curing agent and a curing catalyst with from 50–80% by weight of the total composition of a siliceous heat-resistant reinforcing filler, at least 50% of said filler being in the form of fibers and the remainder in the form of floats, partially curing the dough obtained to allow curing thereof to the consistency required for subsequent rolling, rolling said partially cured dough into said sheet, pressing said sheet around the inside walls of a rocket motor casing to effect bonding between said sheet and the inside of said wall, introducing a castable rocket propellant that has the same binder as said partially cured composition into the casing and fully curing the propellant and insulant to bond the insulant and propellant together.

2. The process comprising mixing in a preheated mixer that is preheated to a temperature of about 140°F a carboxyl-terminated polybutadiene binder, a curing agent of tri-functional epoxide and an iron octasol curing catalyst, admixing the mixture with a siliceous filler comprising from 50–80% by weight of asbestos fibers and 20–50% by weight of asbestos floats, partially curing to a dough of the required consistency for subsequent rolling by heating for about two hours at a temperature of 160°F, rolling the partially cured dough, placing said rolled dough around the inside wall of a rocket motor casing, casting a carboxyl-terminated polybutadiene castable propellant into said casing and fully curing the composite so obtained to effect bonding between the propellant and the insulant and the insulant and the casing.

* * * * *